(12) United States Patent
Zheng et al.

(10) Patent No.: US 12,339,775 B2
(45) Date of Patent: Jun. 24, 2025

(54) HARDWARE ACCELERATOR FOR HYPERGRAPH PROCESSING AND OPERATING METHOD THEREOF

(71) Applicants: Huazhong University Of Science And Technology, Wuhan (CN); Zhejiang Lab, Hangzhou (CN)

(72) Inventors: Long Zheng, Wuhan (CN); Qinggang Wang, Wuhan (CN); Xiaofei Liao, Wuhan (CN); Ao Hu, Wuhan (CN); Hai Jin, Wuhan (CN)

(73) Assignees: Huazhong University of Science and Technology, Wuhan (CN); Zhejiang Lab, Wuhan (CN)

( * ) Notice: Subject to any disclaimer, the term of this patent is extended or adjusted under 35 U.S.C. 154(b) by 153 days.

(21) Appl. No.: 18/145,565

(22) Filed: Dec. 22, 2022

(65) Prior Publication Data
US 2024/0061779 A1 Feb. 22, 2024

(30) Foreign Application Priority Data
Aug. 17, 2022 (CN) .......................... 202210990115.4

(51) Int. Cl.
*G06F 12/0806* (2016.01)
*G06F 12/10* (2016.01)

(52) U.S. Cl.
CPC .......... *G06F 12/0806* (2013.01); *G06F 12/10* (2013.01); *G06F 2212/1016* (2013.01)

(58) Field of Classification Search
CPC .. G06F 12/10; G06F 12/0806; G06F 16/2237; G06F 2111/10; G06F 16/9024;
(Continued)

(56) References Cited
U.S. PATENT DOCUMENTS

| | | | |
|---|---|---|---|
| 2012/0131530 A1* | 5/2012 | Moffitt ................. | G06F 30/331 716/113 |
| 2015/0169467 A1* | 6/2015 | Chase .................... | H04L 45/00 711/216 |

(Continued)

*Primary Examiner* — Yaima Rigol
*Assistant Examiner* — Edward Waddy, Jr.
(74) *Attorney, Agent, or Firm* — Smart & Biggar LP (57) ABSTRACT

The present invention relates to a hardware accelerator for hypergraph processing and its operating method, the hardware accelerator comprising: a data loader: for, in the presence of a data-centric load-trigger-reduce execution model, reading hypergraph partition data from an off-chip memory successively according to hypergraph data structure and an order of hypergraph partitions; an address translator, for deploying the hypergraph data into a private register of a processor and/or into a buffer memory according to a priority level of loaded data, and recording corresponding offset information; a task trigger, for generating computing tasks according to the loaded data, and scheduling the computing tasks into the processor; the processor, for receiving and executing the computing tasks; a reducer, for scheduling intermediate results into a first-priority-data reducer unit or a second-priority-data reducer unit depending on the priority level of the data so as to execute a reducing operation for the intermediate results. In view of the shortcomings of task-centric hardware accelerators, the present invention can prevent any possible data conflict during parallel execution of multiple processing units.

20 Claims, 4 Drawing Sheets

(58) Field of Classification Search
CPC .. G06F 16/7335; G06F 16/2264; G06F 17/11; G06F 16/9014
USPC ... 711/130, 118, 113, 200, 206, 216, 3, 100, 711/E12.001, E12.002, E12.06
See application file for complete search history.

(56) References Cited

U.S. PATENT DOCUMENTS

2017/0364617 A1* 12/2017 Gardner .............. G06F 16/7335
2019/0278760 A1* 9/2019 Smart ................. G06F 16/2264

* cited by examiner

HARDWARE ACCELERATOR FOR HYPERGRAPH PROCESSING AND OPERATING METHOD THEREOF

BACKGROUND OF THE INVENTION

Technical Field

The present invention relates to the technical field of computer hardware accelerator, and more particularly to a hardware accelerator for hypergraph processing and its operating method.

Description of Related Art

Hypergraph structure is high-dimension expansion of normal graphs that merely describe bipartite relationship between entities. It has the ability to natively represent complicated multi-partite relationship among multiple entities as extensively existing in the real world and allows data analytics to get insight from massive entity-relationship data. However, poor locality of memory access can significantly compromise performance of hypergraph processing. In particular, temporal locality is impacted by irregular access to adjacent vertices and adjacent hyperedges. Besides, due to the complicated and intertwined relationship among vertices and hyperedges in a hypergraph, it is usually difficult to come up an optimal scheduling strategy that maximizes potential spatial locality, and this greatly limits spatial locality. While the existing hypergraph processing frameworks based on general architecture and application-specific hardware are somehow technically advanced, they are far from satisfying in terms of access locality during hypergraph processing.

Unlike traditional task-centric computing models that load data according to tasks to be executed and perform corresponding computations, a data-centric model triggers all computing tasks related to data that have been loaded onto on-chip caches to obtain intermediate results, and executes a reducing operation for all intermediate results after all the data to be accessed have been loaded and the related tasks are triggered, so as to get the final result. Such a data-centric computing model is proven to be more capable of maximizing potential data locality during its usage, thereby effectively reducing redundant memory access.

Different from CPUs, GPUs and other general processors designed for non-specific application scenarios, hardware accelerators for this art have data paths and memory systems especially designed and optimized according to application-specific computing and memory access characteristics, thereby achieving good execution efficiency for particular computing tasks. FPGAs provide a target platform for design and implementation of hardware accelerators. As a hardware platform having the ability to reprogram hardware logic, FPGAs are highly flexible making FPGAs ideal for facilitating development, implementation, and iterative optimization of hardware accelerators despite their limitations in terms of clock frequency and hardware resource capacity.

For example, China Patent Publication No. CN108563808A discloses a method for designing an FPGA-based heterogeneous reconfigurable graph processing accelerator system. The accelerator system comprises two major modules, namely a PC and an FPGA. The method includes the following steps. First, a driving module required by activation of the FPGA is loaded. Then devices of the FPGA like PCIe DMA can be turned on. An accelerator engine for graph processing is selected according to the numbers of vertices and edges of the graph data to be processed. After the accelerator engine is selected, the graph data are pre-processed. The pre-processed graph data are then transmitted to an on-board DDR of an FPGA development board through the PCIe DMA. The accelerator is afterward activated to read the graph data from an address designated by the on-board DDR. A controller assigns the graph data to different processing units for processing. After finishing data processing, each of the processing units sends its result to a processing result collecting module, which in turn writes the results back to the on-board DDR. After graph data processing is fully completed, the PC reads the result from the on-board DDR.

Design schemes of FPGA-based hardware accelerators usually employ the similar methods that commonly involve preparing data to be processed at a host, sending the data to the FPGA on-board DDR memory, activating accelerator logic to process the data, and after processing, having the host read processing results back to the host memory from the FPGA on-board DDR, thereby obtaining the processing results.

While designing a hardware accelerator for hypergraph processing based on FPGAs benefits from application-specific data paths and memory sub-systems, this approach idealizes the resource utilization of the off-chip memory. In fact, workload for hypergraph processing is usually not regular at all because connections among vertices and hyperedges are quite complicated. A simple scheduling strategy when used for hypergraph processing can lead to low hit at the caches, which means that most data read to the on-chip caches from the off-chip memory can be soon replaced by new data without being reused. Frequent cache replacement and low on-chip cache hit during hypergraph processing undermine efficiency of memory access seriously and make performance of hypergraph processing greatly limited to memory access performance. Moreover, due to inferior data locality, instead of improving memory access performance, the buffer memory brings about considerable additional energy overheads. To sum up, the objective of the present invention is to provide an execution model for hypergraph processing capable of addressing the foregoing disadvantages and an FPGA-based hardware accelerator device for deploying such an execution model.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

The technical issue to be addressed by the present invention is how to make full use of data locality during hypergraph processing.

In view of the shortcomings of the prior art, the present invention provides a data-centric hardware accelerator for hypergraph processing, at least comprising:

a data loader: for, in the presence of a data-centric load-trigger-reduce execution model, reading hypergraph partition data from an off-chip memory successively according to hypergraph data structure and an order of hypergraph partitions;

an address translator, for deploying the hypergraph data into a private register of a processor and/or into a buffer memory according to a priority level of loaded data, and recording corresponding offset information into a Hash table;

a task trigger, for generating a computing task according to the loaded data, and scheduling the computing task into the processor;

the processor, comprising at least one processing unit, which receives and executes the computing task;

a reducer, for scheduling intermediate results into a first-priority-data reducer unit or a second-priority-data reducer unit depending on the priority of the data so as to execute a reducing operation for the intermediate results.

The present invention provides an execution model that leverages data locality of hypergraph processing algorithms. With efficient task scheduling and priority-based multi-level data caching, the present invention takes the advantage of data locality of applications and minimizes unnecessary memory access, thereby improving processing efficiency.

Preferably, the reducer further comprises an activating unit, wherein when the intermediate results are scheduled into the first-priority-data reducer unit for the reducing operation, the first-priority-data reducer unit reads data from the processing unit, and reduces the intermediate results based on a reducing tree, wherein the reducing operation is not executed until the present hypergraph partition has been completely processed; or when the intermediate results are scheduled into the second-priority-data reducer unit for the reducing operation, the second-priority-data reducer unit acquires intermediate data from the processing unit, and reduces the intermediate results based on a sorting-reducing network; and the activating unit alters its activation state according to changes of vertex data or hyperedge data, wherein the reducing operation and the computing task are executed simultaneously.

Preferably, the address translator has at least one Hash table for storing mapping relationship and an offsets distributor for generating the mapping relationship with private registers for storage, wherein after receiving a vertex index value of a first-priority-level data, the address translator searches the Hash table for a corresponding table entry, and if the table entry has not been initialized, the offsets distributor generates a new private register address and assigns it to the first-priority-level vertex, so that vertex data of first-priority-level data are stored at a corresponding address in the private register, or if the table entry has been initialized, the address translator directly returns the found mapping relationship.

In order to ensure that the hardware accelerator is capable of highly parallel execution without conflict, a priority-based multi-level caching mechanism and a heterogeneous reducing mechanism are adopted, so that first-priority-level vertex data and hyperedge data with more computing tasks are further cached into the private registers of all processing units, thereby preventing access conflict at the on-chip shared memory among multiple processing units processing the same vertex or hyperedge, and ensuring highly parallel execution of processing units of the hardware accelerator. In addition, different reducing mechanism is designed for data with different priority levels so that data with the top priority will not be reduced until all the computing tasks have been completed. This effectively decreases computing workload for reduction and eliminates any possible conflict, thereby ensuring efficient execution throughout the system.

Preferably, the hardware accelerator further comprises the buffer memory, wherein the buffer memory comprises a vertex data memory, a hyperedge data memory, and bipartite edge FIFO queue; and the data loader loads selected activated partitions from the off-chip memory to on-chip, and sends the hypergraph partition data to the buffer memory for storage based on data attributes, wherein the data loader loads the vertex data to the vertex memory, loads the hyperedge data to the hyperedge memory, and stream-loads the bipartite edge data to the bipartite edge FIFO queue, wherein the data are filtered with activation information during data loading.

Preferably, the task trigger acquires bipartite edges from the bipartite edge FIFO queue and generates corresponding computing tasks.

Preferably, after acquiring the bipartite edges, the task trigger acquires storage offset or addresses of corresponding vertices and hyperedges from the address translator, and packages and distributes the bipartite edges and the acquired addresses to a currently idle processing unit for processing.

Preferably, the first-priority-data reducer unit at least comprises a reducing tree, a result buffer queue, and a result writing-back unit, wherein after all the computing tasks of the present hypergraph partition have been completed, the first-priority-data reducer unit reads the data from the private registers of the processing units one by one and inputs the data into the reducing tree; the final reduction result of the intermediate data is stored in the result buffer queue temporarily, and the buffer queue provides the data to the result writing-back units so that the data are written back into the on-chip shared memory; and data in the result buffer queue are provided to the result writing-back unit one by one.

Preferably, the second-priority-data reducer unit at least comprises a sorting-reducing network, an input buffer queue, an output buffer queue, and a result writing-back unit, wherein the results of the second-priority-level data are stored into the input buffer queue of the second-priority-data reducer unit, in order to provide data to the sorting-reducing network; the input buffer queue inputs a predetermined amount of intermediate results to the reducing network every time according to the scale of the sorting-reducing network, for the sorting-reducing network to sort and reduce the input intermediate results in the form of pipeline, so that the output results are ordered and values having the same index are reduced; and the output results of the sorting-reducing network are stored into the output buffer queue, so that the buffer queue provides data to the result writing-back unit and the data are written back into the on-chip shared memory.

In order to make full use of data locality of hypergraph processing algorithms, the inventors of the present invention have analyzed the overlapping property of hypergraphs and the existing execution models for hypergraph processing and devise an efficient hypergraph processing execution model, which implements data-centric processing and prioritizes computing tasks according to data loaded onto the on-chip memory, thereby ensuring that the data loaded onto the on-chip memory can be fully reused.

The present inventions further provide an operating method of hardware accelerator for hypergraph processing, the method at least comprising: in the presence of a data-centric load-trigger-reduce execution model, reading hypergraph partition data from an off-chip memory successively according to hypergraph data structure and an order of hypergraph partitions; deploying the hypergraph data into a private register of a processor and/or into a buffer memory according to a priority level of the loaded data, and recording corresponding offset information into a Hash table; generating computing tasks according to the loaded data, and scheduling the computing tasks into the processor; receiving and executing the computing tasks by at least one processing unit comprised in the processor; scheduling intermediate results into a first-priority-data reducer unit or a second-priority-data reducer unit depending on the priority level of the data so as to execute a reducing operation for the intermediate results.

Preferably, the method further comprises: performing an initialization operation for the hardware accelerator according to the input hypergraph data and hypergraph algorithms before operating the hardware accelerator.

For the hardware accelerator to operate with maximized data locality of hypergraph processing in order to enhance hypergraph processing performance, the inventors of the present invention have analyzed the overlapping property of hypergraphs and the existing execution models for hypergraph processing and devise an efficient hypergraph processing execution model, which implements data-centric processing, prioritizes computing tasks according to data loaded onto the on-chip memory, and prioritizes data according to their reusability, so that data with the top priority can be cached locally, thereby preventing any possible data conflict during parallel execution among multiple processing units and ensuring that the hardware accelerator can perform execution with high parallelism.

DETAILED DESCRIPTION OF THE INVENTION

The present invention will be comprehensively described below with reference to the accompanying drawings.

For ease of understanding, technical terms of the present invention are explained as follows.

Load-Trigger-Reduce (LTR) execution model: herein, a hypergraph is partitioned into several sub-hypergraphs by vertex and hyperedge indexes. A data-centric execution model is used. The model loads one sub-hypergraph every time, and triggers all computing tasks related to this sub-hypergraph. After the computing tasks have all been completed, the remaining sub-hypergraphs are processed one by one successively.

First-priority-level vertex/hyperedge data: herein, the vertex/hyperedge data in a hypergraph are divided into first-priority-level data and second-priority-level data according to potential updating conflicts among multiple processing units during computation. The priority levels are highly related to degrees of vertices/hyperedges. In practical processing, priority levels are defined with respect to the degrees of vertices/hyperedges. This means that a certain part of the vertex/hyperedge data having the highest degrees is defined as the first-priority-level data, and a certain part of the vertex/hyperedge data having the second highest degrees is defined as the second-priority-level data.

Vertex data: vertices in a hypergraph have attribute data, which include but are not limited to topology-related inherent attributes, such as vertex in-degrees and vertex out-degrees, and vertex computing attributes related to hypergraph algorithms.

Hyperedge data: hyperedges in a hypergraph have attribute data, which include but are not limited to topology-related inherent attributes, such as hyperedge in-degrees and hyperedge out-degrees, and hyperedge computing attributes related to hypergraph algorithms.

Bipartite edge data: bipartite edge data are relationship attributes between some vertices in a hypergraph and its related hyperedges, which include but are not limited to weights of relationship between some vertices and their associate hyperedges.

To address limited performance of the existing hypergraph processing systems caused by poor data locality, the present invention provides a hardware accelerator device for hypergraph processing. The disclosed hardware accelerator adopts a novel execution model to make full use of potential data locality when processing hypergraphs, thereby leveraging the benefits of the on-chip vertex memory 51, preventing long idleness of the processing logic for just waiting for data, maximizing execution efficiency of hardware, and improving processing performance.

Figure 1:
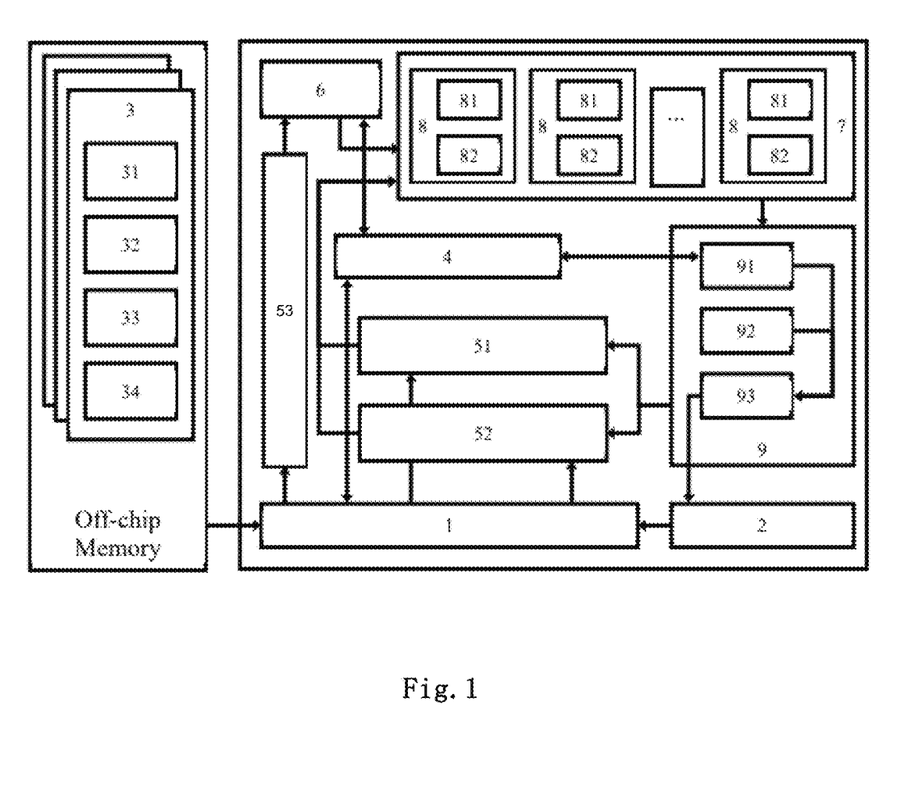
FIG. 1 depicts the hardware structure of a preferred hardware accelerator oriented to hypergraph processing according to the present invention.

As shown in FIG. 1, the hardware accelerator includes at least a data loader 1, an address translator 4, a buffer memory 5, a task trigger 6, a processor 7 and a reducer 9. Preferably, all the components of the hardware accelerator are implemented by dedicated hardware circuits and use dedicated data paths for connection.

For example, the data loader 1 is an application-specific integrated circuit capable of realizing the data loading function of the present invention. The address translator 4 is an application-specific integrated circuit capable of realizing the address translation function of the present invention. The buffer memory 5 is a storage device capable of realizing the buffer storage function of the present invention. The storage device can be, for example, an application-specific integrated chip with a storage function, a magnetic disk, a hard disk or a storage medium. The task trigger 6 is an application-specific integrated circuit capable of realizing the task trigger function of the present invention. The reducer 9 is an application-specific integrated circuit capable of realizing the data reducing function of the present invention.

The foregoing components are implemented on an FPGA platform.

The address translator 4 comprises a Hash table 41 for storing mapping relationship and an offsets distributor 42 for generating mapping relationship with private registers for storage.

A buffer memory 5 comprises a vertex data memory 51, a hyperedge data memory 52, and a bipartite edge FIFO queue 53.

The processor 7 comprises at least one processing unit 8. For example, there may be 16 processing units 8. Every processing unit 8 is composed of processing logic units 81 and private registers 82. The processing logic units 81 and the private registers 82 may each exist in an arbitrary number, which may be determined according to practical needs. The processing logic unit 81 is used to process hypergraph data loaded to the on-chip memory. The private register 82 is used to store first-priority-level vertex/hyperedge data, thereby enabling the processing logic unit 81 to read and write data with high speed and low latency.

The reducer 9 is composed of a first-priority-data reducer unit 91, a second-priority-data reducer unit 92, and an activating unit 93. The first-priority-data reducer unit 91, the second-priority-data reducer unit 92, and the activating unit 93 have data transmitting relationship with each other. The first-priority-data reducer unit 91 is designed for the first-priority-level data. The second-priority-data reducer unit 92 is designed for the second-priority-level data. The activating unit 93 is used to manage the activation information with respect to vertices or hyperedges.

For example, the hardware accelerator device of the present invention may have 16 processing units. Each of the processing units has a private register space of 16 KB, and all the processing units 8 share a 4 MB vertex memory, a 4 MB hyperedge memory, and a 32 KB bipartite edge FIFO queue, totally providing an 8 MB buffer memory space.

As shown in FIG. 1, the data loader 1 is wired to the address translator 4 for data information transmission. The data loader 1 is wired to the activating unit 93 in the reducer 9, so that the data loader 1 reads information from the partitioning table 2 in the reducer 9. The data loader 1 is wired to and therefore has data transmitting relationship with the vertex data memory 51, the hyperedge data memory 52, and the bipartite edge FIFO queue 53, respectively. The vertex data memory 51, the hyperedge data memory 52, and the bipartite edge FIFO queue 53 are wired to the task trigger 6. The address translator 4 is wired to the task trigger 6. The address translator 4 is wired to and therefore has information transmitting relationship with the first-priority-data reducer unit 91 in the reducer 9. The reducer 9 is wired to and therefore has data transmitting relationship with the vertex data memory 51 and the hyperedge data memory 52, respectively.

The processor 7 is wired to and therefore has information transmitting relationship with the vertex data memory 51, the hyperedge data memory 52, the task trigger 6, and the reducer 9, respectively. The data loader 1 is connected to the data input port of the hardware accelerator, so as to receive the hypergraph partitioning data 3.

Preferably, the data loader 1 is for reading the hypergraph data from the off-chip memory to the buffer memory for subsequent processing.

Specifically, the data loader 1 is configured to read the hypergraph data to the chip in the manner described below.

At S11, the data loader 1 extracts an activated partition from the partitioning table 2 and uses it as the hypergraph partition to be processed in the present round.

The partitioning table 2 records the activation information 34 of every partition. Non-activated partitions are not processed in the present round. For any algorithm or any stage of algorithms that involve fewer activated vertices, pre-filtering for partitions to be loaded can be made according to the on-chip partitioning table, so as to effectively decrease the amount of data to be loaded.

At S12, the data loader 1 loads the selected activated partitions from the off-chip memory onto the chip, and stores the data to corresponding on-chip memory according to different data attributes.

Specifically, vertex data 31 are loaded into the vertex memory 51, and hyperedge data 32 are loaded into the hyperedge memory 52, while bipartite edge data 33 are stream-loaded into the bipartite edge FIFO queue 53. The activation information 34 is used as a basis for data filtering during the process of data loading.

At S13, the data loader 1 communicates with the address translator 4 to allocate space in the private register 82 of the processing unit 8 for the first-priority-level data, and further stores a copy of this part of data into the private register 82 of the processing unit 8.

Figure 2:
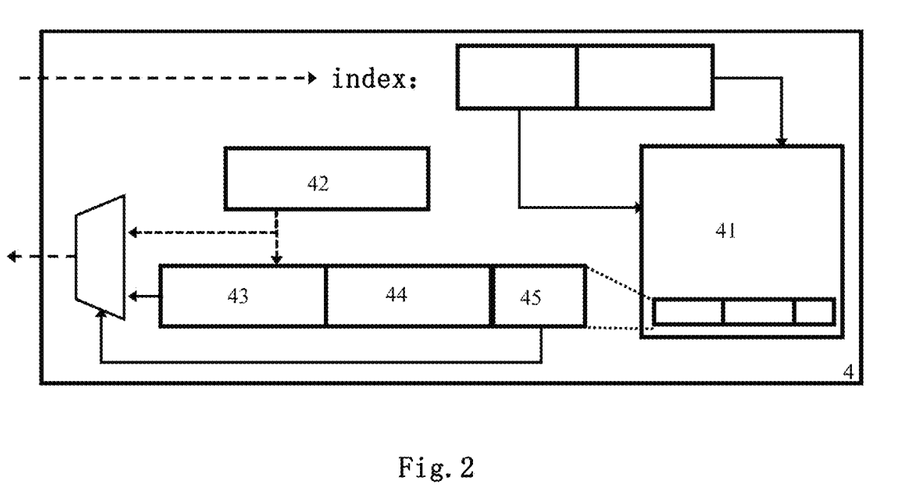
FIG. 2 is a working principle diagram of a preferred address translator module of the present invention.

Preferably, as shown in FIG. 2, the address translator 4 at least comprises a Hash table 41 for storing mapping relationship and an offsets distributor 42 for generating mapping relationship with the private registers for storage. The offsets distributor 42 sends the mapping relationship to the Hash table 41 for storage. Every entry in the Hash table 41 is composed of an offset 43 in the private register, an offset 44 in the shared memory, and an initialization marker 45.

The offset 43 in the private register indicates where the vertex or hyperedge corresponding to the entry is stored in the private register 82. The offset 44 in the shared memory indicates where the vertex or hyperedge corresponding to the entry is stored in the buffer memory 5. The initialization marker 45 indicates whether the entry now has been initialized with effective data. The address translator 4 is configured to enquire and generate address mapping. Preferably, the address translator 4 operates with at least the following steps.

At S21, the address translator 4 receives a request from another module, and finds the corresponding table entry from the Hash table.

Specifically, the received request may be a vertex or hyperedge index. If it is a vertex index, for example, the index is divided into a table ID and a column ID according to the structure of the Hash table, thereby identifying one particular Hash table entry.

At S22, according to the initialization marker of the Hash table entry, the function currently required by the request from the address translator 4 is determined.

Specifically, if the table entry has not been initialized, new mapping relationship has to be generated. If the table entry has been initialized, the mapping relationship found is directly returned.

At S23, for a table entry that has not been initialized, the address translator 4 has to generate new mapping relationship.

Specifically, a new private register offset address of the private register 82 is provided by the offsets distributor 42, and uses the address to generate a new Hash table entry, which is then stored into the Hash table 41.

At S24, the obtained mapping relationship is returned to the requester.

Figure 3:
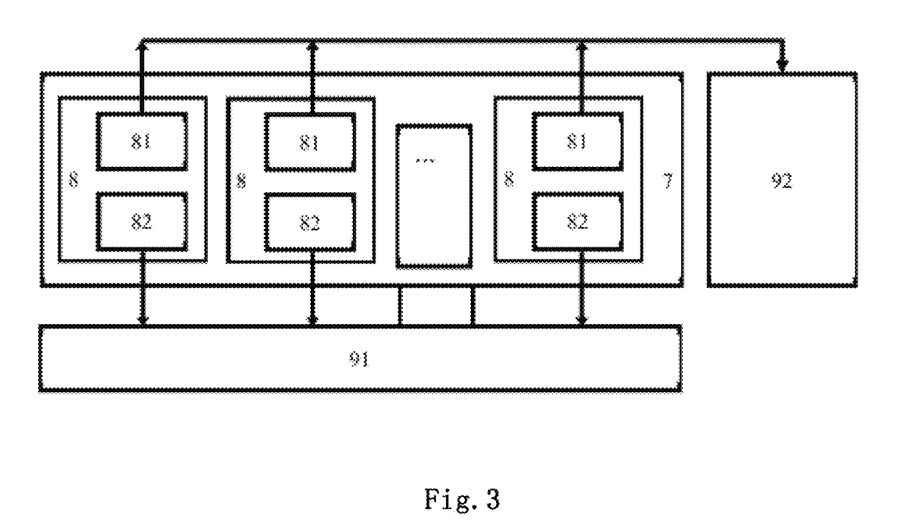
FIG. 3 is a working principle diagram of a preferred heterogeneous reducer module of the present invention.

Preferably, as shown in FIG. 3, the intermediate results are reduced using one of two reducer units depending on the priority level of the corresponding data. The two reducer units are the first-priority-data reducer unit 91 and the second-priority-data reducer unit 92.

Preferably, the reducer 9 operates with the following steps:

At S31, all the processing units 8 in the processor 7 execute the tasks, assigned by the task trigger 6, in parallel.

Specifically, the execution result of a task will alter the value of a vertex or a hyperedge. For first-priority-level data, a copy is stored in the private register 82 of every processing unit 8.

Since reduction usually uses operations like summation, taking the maximum, and taking the minimum. These operations have a common characteristic that they allow a final result to be obtain by performing partial reduction first and then further reducing intermediate results, so the firstpriority-level data can be completely processed in the processing unit 8. Instead of being output, the computing results are directly stored in the private register 82. In such a manner, every private register 82 only stores some intermediate results, and the final computing results can be obtained by further reducing these intermediate results. Second-priority-level data are not responsible for serious conflicts among processing units, so the computing results of tasks related thereto are directly output to reducing logic by the processing unit to be reduced with other intermediate results.

At S32, two kinds of reducers for data of different priority levels are used to reduce the intermediate results obtained after computing at the processing units.

At S321, the first-priority-data reducer unit 91 is triggered by a signal indicating that computing corresponding to the present partition has fully completed. When the bipartite edges in the bipartite edge FIFO queue 53 have all been consumed by the task trigger 6 and all the processing units 8 are idle, the first-priority-data reducer unit 91 starts to read data from all the private registers 82 one by one for reduction.

At S322, the second-priority-data reducer unit 92 is triggered by a second-priority output-result output by the processing unit 8, and operates in parallel with other components in the system. The second-priority-data reducer unit 92 reduces the intermediate results it receives.

Figure 4:
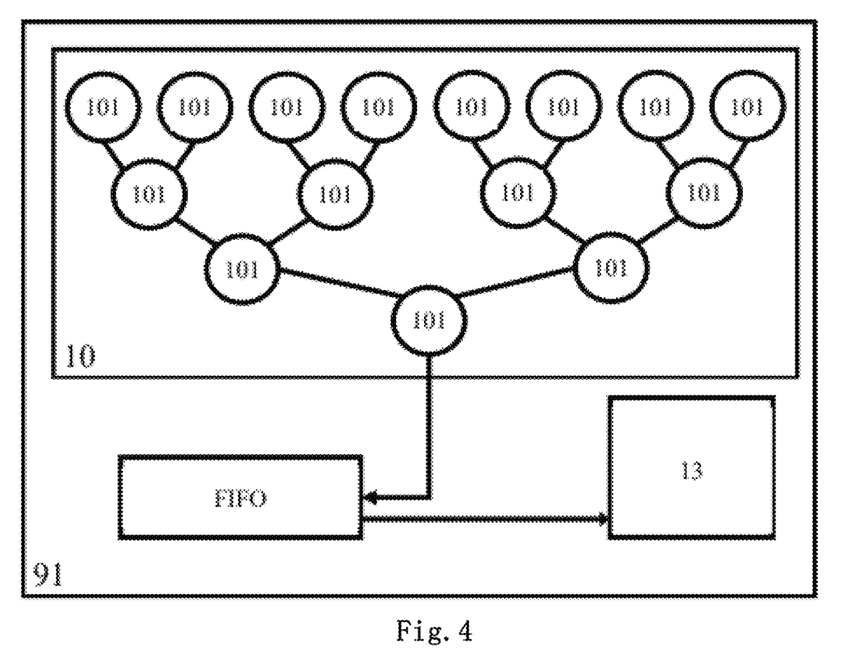
FIG. 4 is a working principle diagram of a preferred first-priority-data reducer unit of the present invention.

Preferably, as shown in FIG. 4, the first-priority-data reducer unit 91 is configured to reduce first-priority-level data stored in the private registers 82 of the processing units. The first-priority-level data at least comprises a reducing tree 10, a result buffer queue, and a result writing-back unit 13. Preferably, as shown in FIG. 3, the first-priority-data reducer unit 91 operates with at least the following steps.

At S41, after all the computing tasks of the present hypergraph partition have been executed and completed, the first-priority-data reducer unit 91 starts to read data into the reducing tree 10 from the private registers 82 of individual processing units one by one.

Specifically, the reducing tree is a complete binary tree, in which every node is a reducer unit 101. The intermediate result data in the private register are reduced in the form of a pipeline.

At S42, the final reduction result of the intermediate data is stored in the result buffer queue, and then the result buffer queue provides the data to the result writing-back unit 13, so that the data can be written back into the on-chip shared memory.

At S43, the result buffer queue provides data to the result writing-back unit 13 successively. The result writing-back unit 13 obtains the address of the data in the on-chip shared memory by communicating with the address translator 4, and then writes the data back.

Figure 5:
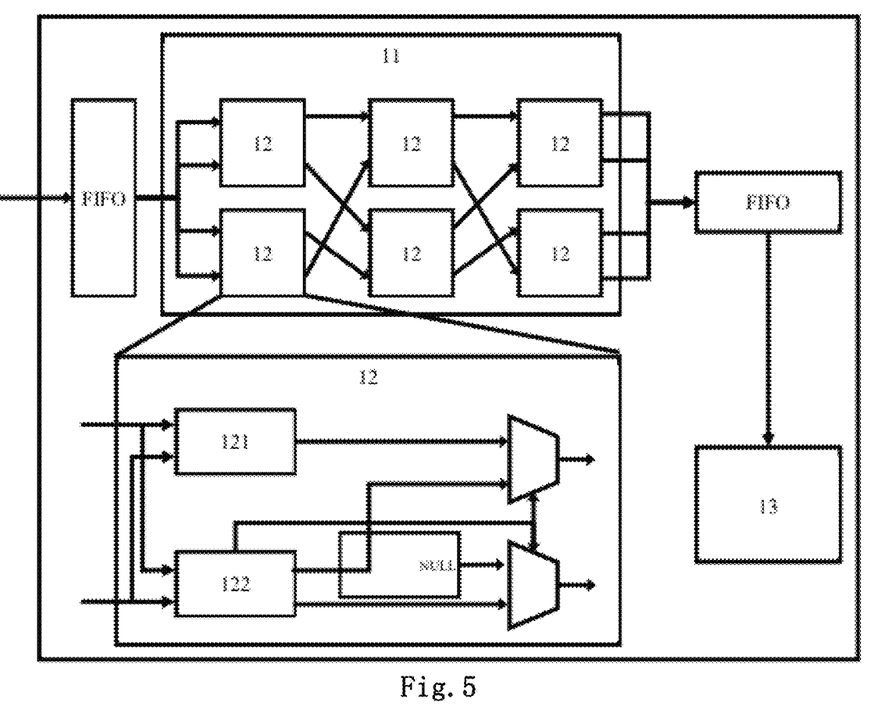
FIG. 5 is a working principle diagram of a preferred second-priority-data reducer unit of the present invention.

Preferably, as shown in FIG. 5, the second-priority-data reducer unit 92 is configured to reduce second-priority-level data output by the processing unit. The second-priority-level data at least comprises a sorting-reducing network 11 composed of sorting-reducing units 12, an input buffer queue, an output buffer queue, and a result writing-back unit 13.

Preferably, the second-priority-data reducer unit operates with at least the following steps.

At S51, the processing logic unit 81 in every processing unit 8 processes the hypergraph, and outputs the second-priority-level data that are then stored into the input buffer queue of the second-priority-data reducer unit 92, so as to provide the data to the sorting-reducing network 11.

At S52, the input buffer queue, according to the scale of the reducing network, outputs a certain number of intermediate results to the reducing network each time. For example, as shown in FIG. 5, the 4 intermediate results are sorted and reduced by the sorting-reducing network in the form of a pipeline, so that the four output results are ordered and the values with the same index are reduced.

Specifically, the sorting-reducing network 11 are composed of several sorting-reducing units 12. The sorting-reducing unit 12 is composed of a value reducing unit 121 and a sorting unit 122. The value reducing unit 121 ignores the index information in the input data. It directly reduces the values of two received data, and select one of the indexes as the index of its result. The sorting unit 122 compares two received indexes so as to sort and output them. Every sorting-reducing unit 12 has two inputs and two outputs. If the two inputs have the same index, the value of the two are reduced, and the post-reduced value and a null will be output. If the two received indexes are different and satisfy a predetermined order, they are output as they are inputted. Otherwise, the two are positionally exchanged before output to the two output ports. According to the desired scale of the sorting-reducing network, a pipeline multi-input sorting-reducing network can be built by providing a certain number of sorting-reducing units and connecting the them with a predetermined network structure.

Preferably, as shown in FIG. 5, for a sorting-reducing network having a scale of 4 inputs, six sorting-reducing units are required. The sorting-reducing units are connected into the network structure as shown in FIG. 5 to form a sorting-reducing network. For such a sorting-reducing network, every two sorting-reducing units are grouped so the six sorting-reducing units are divided into three levels. Sorting tasks are executed parallelly in the form of a pipeline and data flow through the levels in the pipeline successively while processing. The scale of 4 inputs as described herein is merely exemplificative for illustrating the structure of the sorting-reducing network. Alternatively, the network may be scaled-up for more inputs.

At S53, the results output by the sorting-reducing network 11 are stored into the output buffer queue, which then provides the data to the result writing-back unit 13 that writes the data back into the on-chip shared memory.

Figure 6:
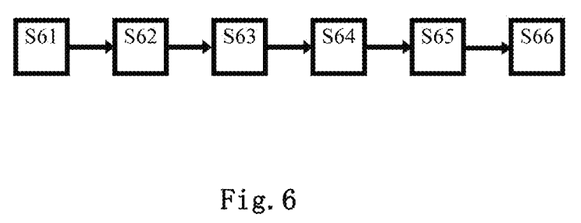
FIG. 6 is a working principle diagram of a preferred hardware accelerator device of the present invention.

For easy understanding, the working principle of hardware accelerator device of the present invention is explained with reference to FIG. 6.

Specifically, the data-centric hardware accelerator device operates with at least the following steps.

At S61, initialization is performed according to the input hypergraph data and hypergraph algorithms.

Specifically, initialization refers to pre-processing and partitioning a hypergraph (including its vertices, hyperedges, and bipartite edges). Herein, pre-processing mainly includes sorting the vertices and/or hyperedges according to their degrees, so as to classify the hypergraph data (including vertex data 31 and hyperedge data 32) into the first-priority-level data and second-priority-level data. In view that higher time overheads may be required for sorting data of the entire hypergraph, an alternative is to identify data of different priorities through sampling-based approximation. Partitioning is about dividing a hypergraph into multiple partitions according to the numbers of vertices and hyperedges. In practical computing, only one partition is loaded onto the chip for processing each time. The hypergraph processing algorithms may be Breadth First Search, Single Source Shortest Paths, PageRank, etc.

At S62, a data-centric load-trigger-reduce execution model is built, so that the data loader 1 reads the hypergraph data from the off-chip memory successively according to the hypergraph data structure and the order of the partitions, and stores the data into the buffer memory.

Preferably, in order to maximize the utilization of data locality during hypergraph processing and thereby minimize redundant memory access, the present invention provides a data-centric load-trigger-reduce execution model. For every hypergraph partition, the data-centric execution model can make full use of data that have been loaded onto the chip, thereby increasing reuse of cache data and decreasing memory access. With pipeline-based execution mode between different hypergraph partitions, the computing time of a previous partition can overlap with the memory access time of its next partition, so as to ensure full use of all components in the hardware accelerator and efficient execution of the entire architecture.

At S63, the address translator 4, according to the priority level of the loaded data, deploys the data to the private register 82 of the processing unit, and records the corresponding offset information into the Hash table 41.

Specifically, the address translator 4 comprises a Hash table 41 for storing mapping relationship and an offsets distributor 42 for generating mapping relationship with the private registers for storage. In the process of data loading, when the data loader 1 reads first-priority-level data (e.g., a first-priority-level vertex), it sends the index value of the vertex to the address translator 4. The address translator 4 searches the Hash table 41 to find the corresponding table entry. At this time, the table entry is always not initialized. The offsets distributor 42 generates a new private register address, and assigns it to the first-priority-level vertex. Next, the vertex data 31 are stored into the corresponding site in the private register, and the initialized table entry is written back into the Hash table.

Therein, the first-priority-level data are sent to both the private register 82 and the buffer memory 5 by the data loader 1 for storage. The second-priority-level data are only sent to the buffer memory 5 by the data loader 1 for storage. The offset information is recorded in the Hash table 41 in the address translator 4.

At S64, the task trigger 6 generates computing tasks according to the loaded data, and schedules them to the processing units 8 in the processor for execution.

Preferably, the task trigger 6 acquires a bipartite edge from the bipartite edge FIFO queue 53 and generates a corresponding computing task. Specifically, after the task trigger 6 acquires a bipartite edge, it acquires storage offset or address of the corresponding vertex and hyperedge in the on-chip memory or private register from the address translator 4, and packages and sends the bipartite edge with the obtained address to a currently idle processing unit 8 for processing.

At S65, in the process that the processor 7 executes the computing task, the reducer 9 schedules the intermediate results to the first-priority-data reducer unit 91 or the second-priority-data reducer unit 92 for reduction of the intermediate results depending on the priority level of the data. Therein, if the intermediate results are scheduled to the first-priority-data reducer unit 91 for reduction, the reduction will not be executed until the present hypergraph partition has been fully processed. The first-priority-data reducer unit 91 reads the data from the private register 82 of the processing unit, and uses the pipeline 10 to reduce the intermediate results. Alternatively, if the intermediate results are scheduled to the second-priority-data reducer unit 92 for reduction, the reduction and the computing task are executed simultaneously. The second-priority-data reducer unit 92 obtains the intermediate data from the processing unit, and uses the sorting-reducing network 11 to reduce the intermediate results. The activating unit 93, according to changes of the vertex or hyperedge data, alters their activation states.

At S66, if the hypergraph algorithm does not converge, the next round of iteration is performed.

Specifically, if there is still any vertex or hyperedge remaining activated, the hypergraph processing does not converge.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A hardware accelerator for hypergraph processing, at least comprising:
   a data loader, configured to, in the presence of a data-centric load-trigger-reduce execution model, read hypergraph partitioning data from an off-chip memory successively according to hypergraph data structure and an order of hypergraph partitions;
   an address translator, configured to deploy the hypergraph partitioning data into at least one of a private register of a processor and a buffer memory according to a priority level of loaded data, and to record corresponding offset information into a Hash table;
   a task trigger, configured to generate computing tasks according to the loaded data, and to schedule the computing tasks into the processor;
   the processor, comprising at least one processing unit, which receives and executes the computing tasks;
   a reducer, configured to schedule intermediate results into a first-priority-data reducer unit in response to determining the priority level of the loaded data is a first-priority level or a second-priority-data reducer unit in response to determining the priority level of the loaded data is a second-priority level so as to execute a reducing operation for the intermediate results.

2. The hardware accelerator for hypergraph processing of claim 1, wherein the reducer further comprises an activating unit, wherein
   in response to determining the intermediate results are scheduled into the first-priority-data reducer unit, the first-priority-data reducer unit reads data from the processing unit, and reduces the intermediate results based on a reducing tree, wherein the reducing operation is not executed until a present hypergraph partition has been completely processed; and
   in response to determining the intermediate results are scheduled into the second-priority-data reducer unit, the second-priority-data reducer unit acquires intermediate data from the processing unit, and reduces the intermediate results based on a sorting-reducing network; and the activating unit alters the activation states of vertices or hyperedges according to changes of vertex data or hyperedge data, wherein the reducing operation and the computing task are executed simultaneously.

3. The hardware accelerator for hypergraph processing of claim 2, wherein the address translator has at least one Hash table that is configured to store mapping relationship and an offsets distributor that is configured to generate the mapping relationship, wherein
after receiving a vertex index value in the first-priority-level data, the address translator searches the Hash table for a corresponding table entry, and
in response to determining the table entry has not been initialized, the offsets distributor generates a new private register address and assigns it to a first-priority-level vertex, so that vertex data in the first-priority-level data are stored at a corresponding address in the private register, and
in response to determining the table entry has been initialized, the address translator directly returns the found mapping relationship.

4. The hardware accelerator for hypergraph processing of claim 3, wherein the hardware accelerator further comprises the buffer memory, wherein
the buffer memory comprises a vertex data memory, a hyperedge data memory, and bipartite edge FIFO queue; and
the data loader loads selected activated partition from the off-chip memory to the on-chip memory, and sends the hypergraph partitioning data to the buffer memory for storage based on data attributes, wherein
the data loader loads the vertex data to the vertex memory, loads the hyperedge data to the hyperedge memory, and stream-loads the bipartite edge data to the bipartite edge FIFO queue, wherein the data are filtered with activation information during loading.

5. The hardware accelerator for hypergraph processing of claim 4, wherein
the task trigger acquires bipartite edges from the bipartite edge FIFO queue and generates corresponding computing tasks.

6. The hardware accelerator for hypergraph processing of claim 5, wherein after acquiring the bipartite edges, the task trigger acquires at least one of a storage offset and addresses of corresponding vertices and hyperedges from the address translator, and packages and distributes the bipartite edges and the acquired addresses to currently idle processing units.

7. The hardware accelerator for hypergraph processing of claim 6, wherein the first-priority-data reducer unit at least comprises a reducing tree, a result buffer queue, and a result writing-back unit, wherein
after all the computing tasks of the present hypergraph partition have been executed and completed, the first-priority-data reducer unit reads the data from the private registers of the processing units one by one and inputs the data into the reducing tree;
a final reduction result of the intermediate data is stored in the result buffer queue, and the result buffer queue provides the data to the result writing-back units so that the data are written back into an on-chip shared memory; and
for the result buffer queue, the data are provided to the result writing-back unit one by one.

8. The hardware accelerator for hypergraph processing of claim 7, wherein the second-priority-data reducer unit at least comprises a sorting-reducing network, an input buffer queue, an output buffer queue, and a result writing-back unit, wherein
outputs generated as a result of that the processing unit processes the second-priority-level data are stored into an input buffer queue of the second-priority-data reducer unit, so that the processing unit provides data to the sorting-reducing network;
the input buffer queue inputs intermediate results to the reducing network at a predetermined amount every time according to a scale of the sorting-reducing network, for the sorting-reducing network to sort and reduce the input intermediate results in the form of pipeline, so that the output results are ordered and values having the same index are reduced; and
the output results of the sorting-reducing network are stored into the output buffer queue, so that the buffer queue provides data to the result writing-back unit and the data are written back into the on-chip shared memory.

9. The hardware accelerator for hypergraph processing of claim 8, wherein
the data loader is wired to the address translator for data information transmission,
the data loader is wired to the activating unit in the reducer, so that the data loader reads information from the partitioning table in the reducer,
the data loader is wired to and therefore has data transmitting relationship with the vertex data memory, the hyperedge data memory, and the bipartite edge FIFO queue, the vertex data memory, the hyperedge data memory, and the bipartite edge FIFO queue are wired to the task trigger,
the address translator is wired to the task trigger,
the address translator is wired to and therefore has information transmitting relationship with the first-priority-data reducer unit in the reducer,
the reducer is wired to and therefore has data transmitting relationship with the vertex data memory and the hyperedge data memory, respectively.

10. The hardware accelerator for hypergraph processing of claim 9, wherein the processor is wired to and therefore has information transmitting relationship with the vertex data memory, the hyperedge data memory, the task trigger, and the reducer, respectively,
the data loader is connected to the data input port of the hardware accelerator, so as to receive the hypergraph partitioning data.

11. An operating method of hardware accelerator for hypergraph processing, the method at least comprising:
in the presence of a data-centric load-trigger-reduce execution model, reading hypergraph partitioning data from an off-chip memory successively according to hypergraph data structure and an order of hypergraph partitions;
deploying the hypergraph partitioning data into at least one of a private register of a processor and a buffer memory according to a priority level of loaded data, and recording corresponding offset information into a Hash table;
generating computing tasks according to the loaded data, and scheduling the computing tasks into the processor;
receiving and executing the computing tasks by at least one processing unit comprised in the processor;
scheduling intermediate results into a first-priority-data reducer unit in response to determining the priority level of the loaded data is a first-priority level or a second-priority-data reducer unit in response to determining the priority level of the loaded data is a second-priority level so as to execute a reducing operation for the intermediate results.

12. The operating method of hardware accelerator for hypergraph processing of claim 11, wherein the method further comprises:
performing an initialization operation for the hardware accelerator according to the input hypergraph data and hypergraph algorithms before operating the hardware accelerator.

13. The operating method of hardware accelerator for hypergraph processing of claim 12, wherein the method further comprises:
in response to determining the intermediate results are scheduled into the first-priority-data reducer unit, the first-priority-data reducer unit reads data from the processing unit, and reduces the intermediate results based on a reducing tree, wherein the reducing operation is not executed until a present hypergraph partition has been completely processed; and
in response to determining the intermediate results are scheduled into the second-priority-data reducer unit, the second-priority-data reducer unit acquires intermediate data from the processing unit, and reduces the intermediate results based on a sorting-reducing network; and the activating unit alters the activation states of vertices or hyperedges according to changes of vertex data or hyperedge data, wherein the reducing operation and the computing task are executed simultaneously.

14. The operating method of hardware accelerator for hypergraph processing of claim 13, wherein the address translator has at least one Hash table that is configured to store mapping relationship and an offsets distributor that is configured to generate the mapping relationship, wherein
after receiving a vertex index value in the first-priority-level data, the address translator searches the Hash table for a corresponding table entry, and
in response to determining the table entry has not been initialized, the offsets distributor generates a new private register address and assigns it to a first-priority-level vertex, so that vertex data in the first-priority-level data are stored at a corresponding site in the private register, and
in response to determining the table entry has been initialized, the address translator directly returns the found mapping relationship.

15. The operating method of hardware accelerator for hypergraph processing of claim 14, wherein the data loader loads selected activated partition from the off-chip memory to the on-chip memory, and sends the hypergraph partitioning data to a buffer memory for storage based on data attributes, wherein
the data loader loads the vertex data to vertex memory, loads the hyperedge data to the hyperedge memory, and stream-loads the bipartite edge data to a bipartite edge FIFO queue, wherein the data are filtered with activation information during loading.

16. The operating method of hardware accelerator for hypergraph processing of claim 15, wherein the task trigger acquires bipartite edges from the bipartite edge FIFO queue and generates corresponding computing tasks.

17. The operating method of hardware accelerator for hypergraph processing of claim 16, wherein after acquiring the bipartite edges, the task trigger acquires at least one of a storage offset and addresses of corresponding vertices and hyperedges from the address translator, and packages and distributes the bipartite edges and the acquired addresses to currently idle processing units.

18. The operating method of hardware accelerator for hypergraph processing of claim 17, wherein
after all the computing tasks of the present hypergraph partition have been executed and completed, the first-priority-data reducer unit reads the data from the private registers of the processing units one by one and inputs the data into the reducing tree;
a final reduction result of the intermediate data is stored in the result buffer queue, and the result buffer queue provides the data to the result writing-back units so that the data are written back into an on-chip shared memory; and
for the result buffer queue, the data are provided to a result writing-back unit one by one.

19. The operating method of hardware accelerator for hypergraph processing of claim 18, wherein
outputs generated as a result of that the processing unit processes the second-priority-level data are stored into an input buffer queue of the second-priority-data reducer unit, so that the processing unit provides data to a sorting-reducing network;
an input buffer queue inputs intermediate results to the reducing network at a predetermined amount every time according to a scale of the sorting-reducing network, for the sorting-reducing network to sort and reduce the input intermediate results in the form of pipeline, so that the output results are ordered and values having the same index are reduced; and
the output results of the sorting-reducing network are stored into an output buffer queue, so that the buffer queue provides data to a result writing-back unit and the data are written back into the on-chip shared memory.

20. The operating method of hardware accelerator for hypergraph processing of claim 19, wherein
the data loader is wired to the address translator for data information transmission,
the data loader is wired to the activating unit in the reducer, so that the data loader reads information from the partitioning table in the reducer,
the data loader is wired to and therefore has data transmitting relationship with the vertex data memory, the hyperedge data memory, and the bipartite edge FIFO queue,
the vertex data memory, the hyperedge data memory, and the bipartite edge FIFO queue are wired to the task trigger,
the address translator is wired to the task trigger,
the address translator is wired to and therefore has information transmitting relationship with the first-priority-data reducer unit in the reducer,
the reducer is wired to and therefore has data transmitting relationship with the vertex data memory and the hyperedge data memory, respectively.

\* \* \* \* \*